United States Patent

Takeda et al.

[11] Patent Number: 5,507,134
[45] Date of Patent: Apr. 16, 1996

[54] PACKAGE RECTIFYING APPARATUS

[75] Inventors: Masahiro Takeda; Yasushi Yakushigawa, both of Shiga, Japan

[73] Assignee: Ishida Co., Ltd., Kyoto, Japan

[21] Appl. No.: 211,071

[22] PCT Filed: Jul. 19, 1993

[86] PCT No.: PCT/JP93/01007

§ 371 Date: Mar. 18, 1994

§ 102(e) Date: Mar. 18, 1994

[87] PCT Pub. No.: WO94/02597

PCT Pub. Date: Feb. 3, 1994

[30] Foreign Application Priority Data

Jul. 21, 1992 [JP] Japan .................... 4-193799

[51] Int. Cl.⁶ .................................. B65B 35/44
[52] U.S. Cl. .................. 53/531; 53/247; 53/537; 53/540; 53/544
[58] Field of Search ............... 198/418.3, 418.9, 198/431; 53/244, 247, 531, 537, 540, 544

[56] References Cited

U.S. PATENT DOCUMENTS

| | | | |
|---|---|---|---|
| 2,748,917 | 6/1956 | Rawe | 198/418.9 |
| 4,135,616 | 6/1979 | Pellaton | 198/418.9 |
| 4,446,675 | 5/1984 | Mewes | 53/537 X |
| 4,611,458 | 9/1986 | Prakken | 53/537 |
| 4,765,452 | 8/1988 | Johansson | 198/431 |
| 4,984,677 | 1/1991 | Prakken | 53/245 X |
| 5,022,218 | 6/1991 | Prakken | 53/540 X |
| 5,100,124 | 3/1992 | Poulique | 198/418.9 X |

FOREIGN PATENT DOCUMENTS

| | | |
|---|---|---|
| 471822 | 1/1972 | Japan . |
| 4932830 | 9/1974 | Japan . |
| 53-140684 | 11/1978 | Japan . |
| 5993617 | 5/1984 | Japan . |

*Primary Examiner*—Linda Johnson
*Assistant Examiner*—Daniel Moon
*Attorney, Agent, or Firm*—Loeb & Loeb

[57] ABSTRACT

A package rectifying apparatus designed to prevent a rearmost one of packages (3) from being toppled rearwardly to fall down even though the packages have been rectified so as to partially overlap with each other and also to enable the amount of overlap between each neighboring packages to be adjustable. This package rectifying apparatus includes a rectifying and transport means (5,30,43) for bringing a leading end of one (3-2) of packages (3), having contents sealed therein, under a training end of another one (3-1) of the packages (3) which precedes such one (3-2) of the packages (3) so as to overlap the trailing end of such another one (3-1) of the packages (3) over the leading end of such one (3-2) of the packages (3) while the packages (3) are successively transported in a predetermined direction, and an overlap amount adjusting means (51,52,53) for adjusting the amount of feed of the packages (3) by the rectifying and transport means (5,30,43) to thereby adjust the amount of overlap between the neighboring packages (3).

9 Claims, 13 Drawing Sheets

PACKAGE RECTIFYING APPARATUS

FIELD OF TECHNOLOGY

The present invention generally relates to an apparatus for handling packages of articles to be bagged such as, for example, candies or the like and, more particularly, to the apparatus for rectifying the packages in overlapped relationship with each other before the packages are put into a box.

BACKGROUND ART

A number of packages each comprising a sealed bag of articles such as candies or the like loaded thereinto by the use of a well-known packaging or bagging machine are generally packed in a box in a plurality of layers one above the other from the bottom of the box while the packages forming each layer are laid down, before the box are sealed with the packages therein. By way of example, if a row of the packages 3 are merely laid down horizontally as shown in FIG. 29, it may often occur that the total length L of the row of the packages 3 amounts to a value greater than the length L1 of the box used to accommodate the packages 3 in pile-up layers. In order to increase the packing density of the packages into the box, it has been suggested to lay the packages 3 down with the neighboring packages partially overlapped with each other as shown in FIG. 30. Specifically, in FIG. 30, the row of the packages 3 are laid down with a leading end of one package 3 overlapping a trailing end of the preceding package 3 with respect to the direction of transport C.

However, when the row of the packages is subsequently transported by means of a conveyor 91 or the like while they are laid in the illustrated manner, and since the leading end of the rearmost package 3 overlays the trailing end of the preceding package 3, there is a possibility that the rearmost one of the packages 4 will be toppled rearwardly to fall down as indicated by the phantom line as flapped by a wind pressure. Where articles such as, for example, potato chips as warmed are packaged, each package 3 is thermally expanded to have an increased thickness and, therefore, such rearward toppling of the rearmost package as discussed above tends to occur. Also, since the amount of overlap permitted between the neighboring packages 3 is substantially fixed, the difference occurs between the total length L of the row of the packages 3 and the length L1 of the box when the packages 3 are desired to be packed in boxes of a different size, and therefore, the packages 3 cannot be satisfactorily and efficiently packed in those boxes.

In view of the above, it has been suggested in, for example, any one of the Japanese Laid-open Patent Publications No. 59-134105, published Aug. 1, 1984 and No. 64-84806, published Mar. 30, 1989, that as shown in FIG. 31 the packages 3 in a row are overlapped in a reverse direction, that is, the packages 3 are laid down with a leading end of one package 3 crawled under a trailing end of the preceding package 3 with respect to the direction of transport C. According to this method, although the problem associated with the rearward toppling of the rearmost package 3 can be eliminated, the fact that the amount of overlap permitted between the neighboring packages 3 is fixed renders it difficult for the packages 3 to be packed in boxes of a different size.

DISCLOSURE OF THE INVENTION

In view of the foregoing, an object of the present invention is to alleviate the various problems inherent in the prior art package rectifying method and to provide an efficient package rectifying apparatus of a type wherein, after rectification of a required number of the packages, the leading end of the rearmost package in the row of the packages is crawled under the trailing end of the preceding package so that the rearmost package does not topple rearwardly to fall down even though the row of the packages continues to be transported, thereby facilitating the handling of the packages and, also, wherein the amount of overlap between the neighboring packages can be adjusted and, therefore, no difference between the total length of the packages and the size of the box is created even though the size of the box or the number of the packages laid down in the box varies, making it possible for the packages to be efficiently and snugly packed in a box without manual handling.

In order to accomplish the above described object, a package rectifying apparatus according to the present invention comprises a rectifying and transport means for bringing a leading end of one of packages, having contents sealed therein, under a training end of another one of the packages which precedes such one of the packages so as to overlap the trailing end of such another one of the packages over the leading end of such one of the packages while the packages are successively transported in a predetermined direction; and an overlap amount adjusting means for adjusting the amount of feed of the packages by the rectifying and transport means to thereby adjust the amount of overlap between the neighboring packages.

According to the above described construction, since the rectifying and transport means is operable to cause the trailing end of the preceding package to overlap the leading end of the next succeeding package, the leading end of the rearmost one of the packages rectified in a row containing the required number of the packages can be held having crawled under the trailing end of the immediately preceding package. Accordingly, the packages in the row can easily and efficiently handled with no possibility of the rearmost package being toppled rearwardly to fall down under the influence of a wind pressure. Also, since the overlap amount adjusting means does effectively adjust the amount of overlap between the neighboring packages, no difference between the total length of the packages and the size of the box is created even though the size of the box or the number of the packages laid down in the box varies, making it possible for the packages to be efficiently and snugly packed in a box. Moreover, the rectification of the packages is automatically performed, requiting no manual intervention in handling the packages and, therefore, the efficiency of work is high.

According to a preferred embodiment of the present invention, the rectifying and transport means comprises a transport mechanism for successively supplying the packages, a holding means for receiving such another one of the packages transported by the transport mechanism and for retaining the trailing end of such another of the packages above the leading end of such one of the packages while such another one of the packages is brought to a standstill, and an overlapping means for driving the transport mechanism to transport such one of the packages so as to bring the leading end of such one of the packages under the trailing end of such another one of the packages then retained by the holding means.

Preferably, the overlap amount adjusting means may comprises a position adjusting means for adjusting a holding position of the another one of the packages with respect to the direction of successive transport of the packages.

According to this preferred embodiment of the present invention, the successive transport of the packages and the partial overlapping between the neighboring packages while the amount of overlap therebetween is adjusted can be sequentially performed in a series of sequential operation.

BRIEF DESCRIPTION OF THE DRAWINGS

In and throughout the following accompanying drawings, like parts are designated by like reference numerals.

BEST MODE FOR CARRYING OUT THE INVENTION

Preferred embodiments of the present invention will be hereinafter described with reference to the accompanying drawings.

First Embodiment

Figure 1:
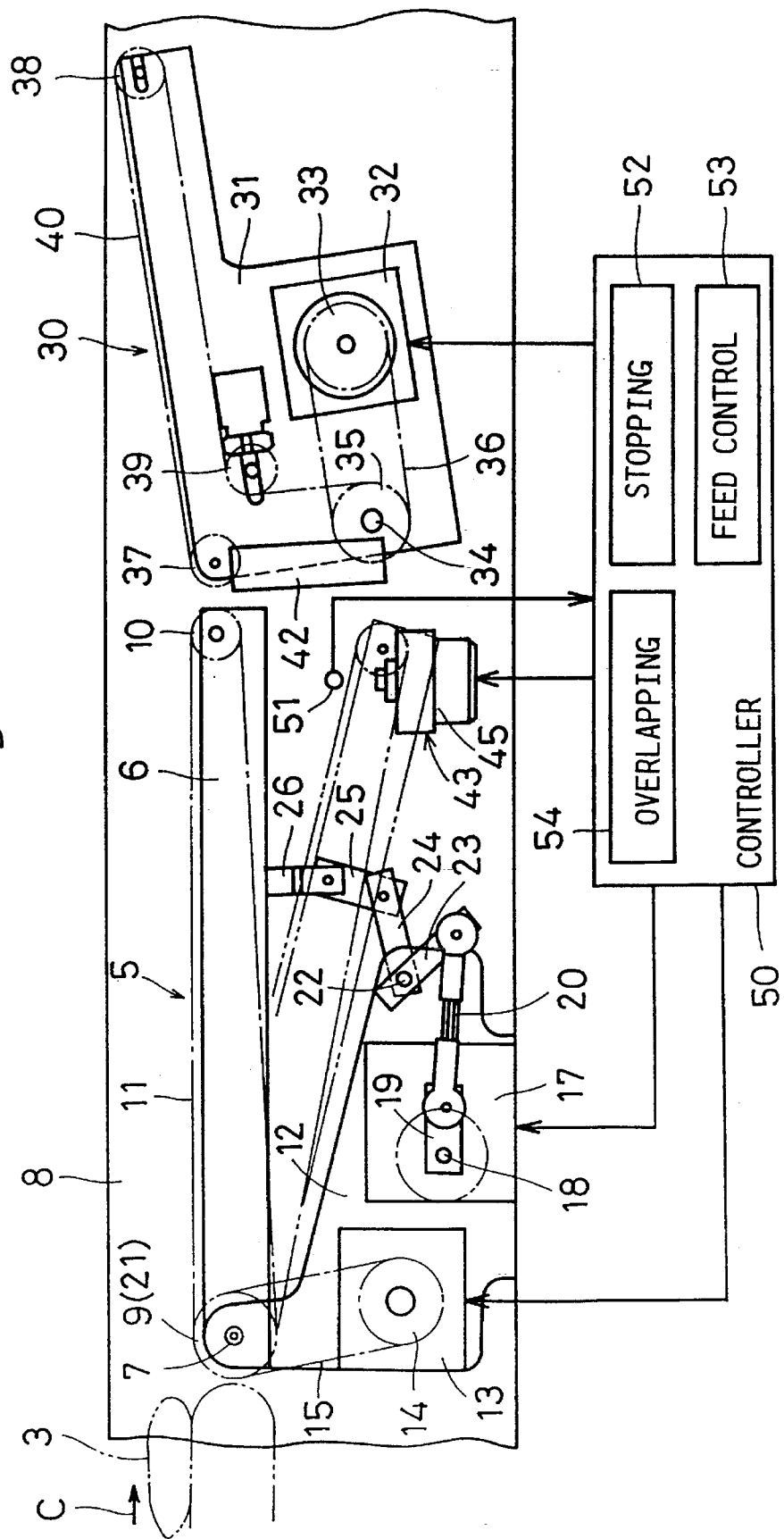
FIG. 1 is a side view, with a portion cut away, of a package rectifying apparatus according to a first preferred embodiment of the present invention.
Figure 2:
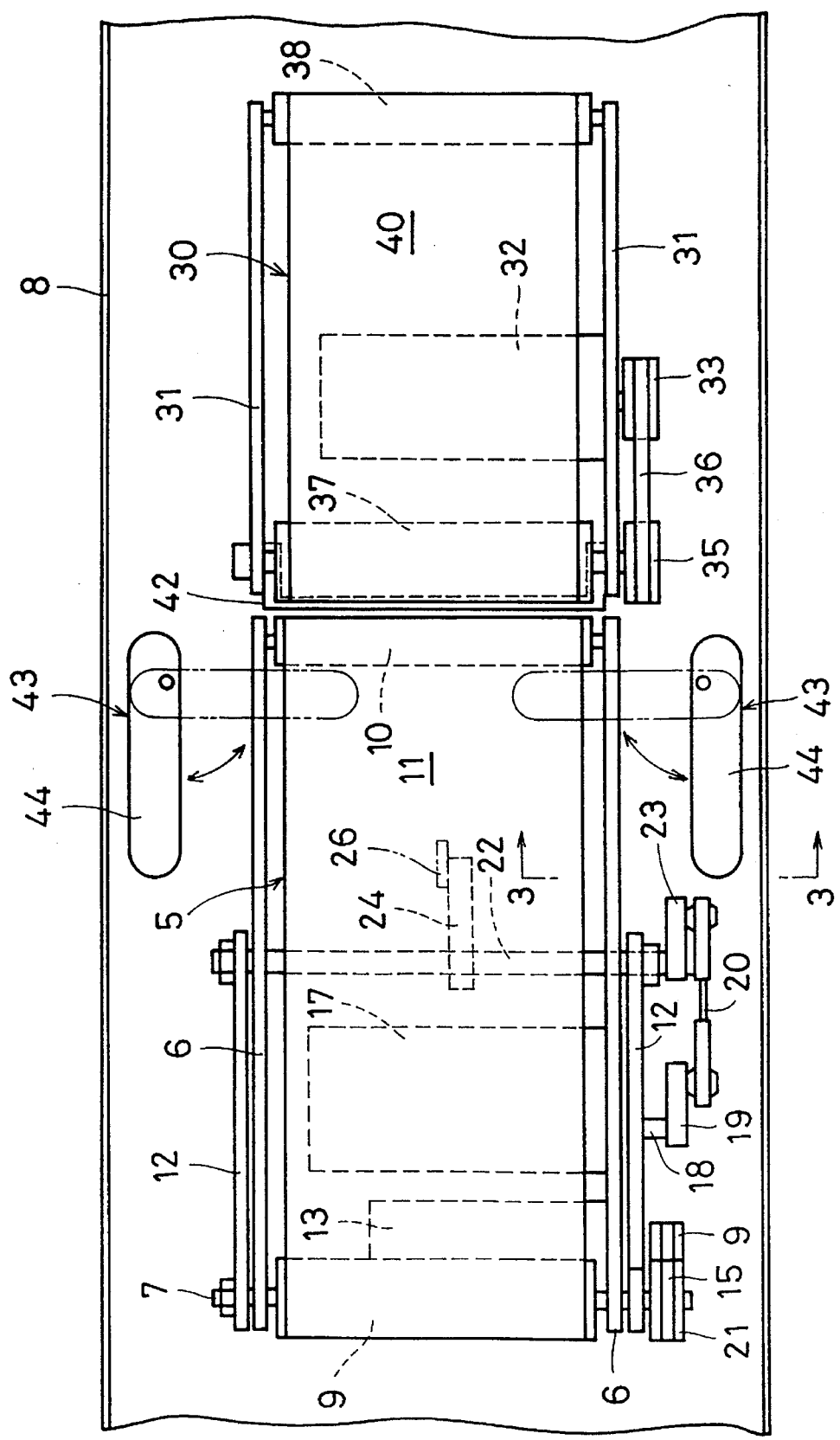
FIG. 2 is a top plan view of the package rectifying apparatus according to the first preferred embodiment of the present invention.
Figure 3:
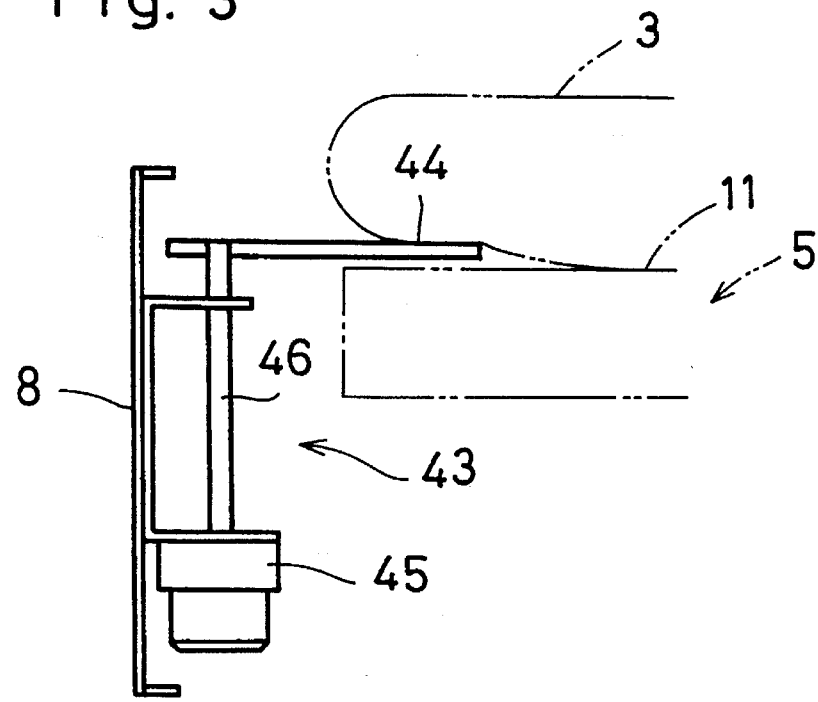
FIG. 3 is a cross-sectional view taken along the line 3—3 in FIG. 2.

FIGS. 1 to 3 illustrates a first preferred embodiment of the present invention. Referring first to FIG. 1, reference numeral 8 represents a machine framework including a pair of first brackets 12 mounted thereon. A support shaft 7 has its opposite end portions rotatably supported by the respective brackets 12. A pair of elongated support frames 6 for the support of a movable conveyor (a first conveyor) 5 have one ends positioned adjacent a receiving side (a left-hand side) from which packages 3 are successively delivered onto the movable conveyor 5 are received. That ends of the elongated support flames 6 adjacent the receiving side are rotatably mounted on the respective end portions of the support shaft 7 so that opposite free ends of the elongated support frames 6 positioned at a delivery side (a fight-hand side), from which the packages 3 having been transported by the movable conveyor 5 can be discharged, can move up and down about the support shaft 7. The movable conveyor 5 includes an conveyor belt 11 trained between a main drive roll 9, mounted on the support shaft 7, and an idle roll 10 rotatably supported by and between the free ends of the elongated support frames 6. A first drive unit 13 comprised of a servo-motor is rigidly mounted on one of the first brackets 12 and includes a main drive pulley 14. The main drive pulley 14 is drivingly coupled by means of a belt 15 with a driven pulley 21 mounted on the support shaft 7.

The first bracket 12 carrying the first drive unit 13 also has a second drive unit 17 comprised of a motor and having a drive shaft 18 on which a stem of an elongated cranking plate 19 is mounted. A turnbuckle 20 has one end pivotally connected with a free end of the cranking plate 19 opposite to the stem and the other end pivotally connected with one end of a first link 23. The first link 23 is in turn pivotally mounted on a support stud 22 journalled to the first bracket 12. A second link 24 has one end pivotally connected to the support stud 22 and the opposite end pivotally connected with one end of a third link 25 which has in turn the opposite end pivotally connected with a lower end of a connecting rod 26 rigidly secured to one of the elongated support frames 6 so as to extend generally downwardly therefrom.

The machine framework 8 also includes a pair of second brackets 31 in alignment with the pair of the first bracket 12, said pair of the second brackets 31 supporting a fixed conveyor (a second conveyor) 30 positioned adjacent to and on a leading side of the movable conveyor 5 with respect to the direction of transport C. The fixed conveyor 30 is so supported and so positioned that, when the delivery end or discharge end of the movable conveyor 5 is moved upwardly to assume a position shown by the solid line, the fixed conveyor 30 can receive the package 3 from the movable conveyor 5.

A third drive unit 32 comprised of a variable-speed servo-motor is rigidly mounted on one of the second brackets 31 and includes a main drive pulley 33 drivingly coupled through a belt 36 with a driven pulley 35 rotatably mounted on a shaft 34 that is journalled to the second bracket 31. A main drive roll 37 is mounted on the shaft 34 in coaxial relation with the driven pulley 35 as shown in FIG. 2. The second brackets 31 carry, in addition to the main drive roll 37 on the shaft 34, an idle roll 38, rotatably supported at a discharge end, and a pair of intermediate guide rolls 39 positioned between the main drive roll 37 and the idle roll 38 as shown in FIG. 1. A conveyor belt 40 forming a part of the fixed conveyor 30 is trained between the main drive roll 37 and the idle roll 38 via the intermediate guide rolls 39.

A stopper 42 for positioning the packages 3 in abutment therewith is disposed in the vicinity of the discharge end of the movable conveyor 5 so as to extend downwardly while a holding means 43 for holding the packages 3 is disposed between the movable conveyor 5 and the fixed conveyor 30 as shown in FIG. 2. As best shown in FIG. 3, the holding means 43 includes a pair of holding levers 44 adapted to be positioned above the discharge end of the movable conveyor 5 so as to hold the packages 3 one by one and, for this purpose, the holding levers 44 have their stems mounted on upper ends of respective rotatable operating rods 46 of fourth drive units 45 positioned laterally outwardly of the movable conveyor 5 and each comprised of a rotary air-cylinder. Thus, it will readily be seen that, when the fourth drive units 45 are activated, the holding levers 44 can be moved into or out of a position above the conveyor belt 11 of the movable conveyor 5 then held at an elevated position, that is, moved into or out of that portion of a transport path which straddles between the conveyor belts 11 and 40 as shown in FIG. 2, respectively.

The first to fourth drive units 13, 17, 32 and 45 are adapted to be controlled by a common controller 50 shown in FIG. 1.

With the movable conveyor 5 held at a lowered position shown by the phantom line in FIG. 1, an article detecting sensor 51 comprised of a combination of, for example, a light emitting element and a photoelectric tube is secured to a portion of the machine framework 8 adjacent the discharge end of the movable conveyor 5 in the lowered position. The controller 50 referred to above includes a stop means 52 for bringing the first drive unit 13 to a halt at a predetermined timing after it has received a detection signal from the sensor 51 indicative of the presence of a package 3, and a feed control means 53 for driving the first and third drive units 13 and 32, when the movable conveyor 5 is moved to the elevated position, for transporting the package 3 a predetermined distance from the position at which the package is halted. The controller 50 also includes an overlapping means 54 for driving the first drive unit 13 to run the movable conveyor 5 during a period in which the preceding package is held by the holding levers 44, so that the next succeeding package can be fed towards under the preceding package According to the embodiment shown in FIGS. 1 to 3, the movable conveyor 5 and the fixed conveyor 30 together constitute a transport mechanism operable to transport the packages 3 successively, and the transport mechanism 5 and 30, the holding means 43 and the overlapping means 54 included in the controller 50 together constitute a rectifying and transporting means operable to overlap the neighboring packages 3 partially with each other while feeding them. Also, the article detecting sensor 51, the stop means 52 and the feed control means 53 together constitute a position adjusting means for adjusting the position of the preceding package with respect to the direction of transport thereof.

In this illustrated embodiment, during an inoperative condition of the package rectifying apparatus, the support frames 6 of the movable conveyor 5 is pivoted about the support shaft 7 with the discharge end of the movable conveyor 5 moved downwardly to assume the lowered position as shown by the phantom line in FIG. 1. Starting from this condition and when the package rectifying apparatus is operated, the first package 3-1 having discharged from the packaging or bagging machine and then transported by means of a suitable transport means (not shown) is loaded onto the conveyor belt 11 of the movable conveyor 5 at the receiving side.

Figure 4:
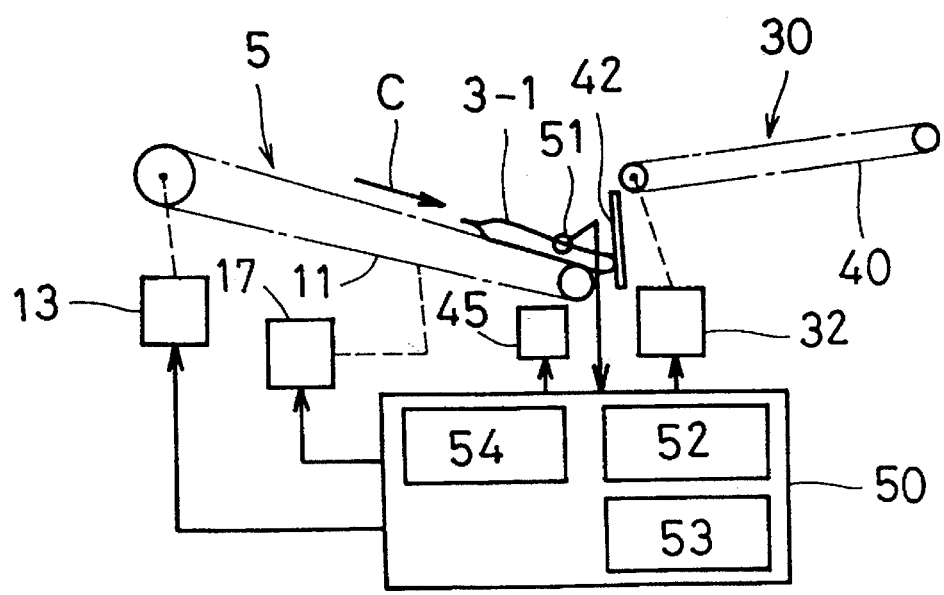
FIG. 4 is a schematic side view of a portion of the package rectifying apparatus according to the first preferred embodiment of the present invention, showing a first step performed by the package rectifying apparatus.

At this time, the conveyor belt 11 is driven by the first drive unit 13 through the main drive pulley 14, the driven pulley 21 and the drive belt 15 and, therefore, the first package 3-1 is transported towards the discharge end of the movable conveyor 5 as shown in FIG. 4, whereupon the article detecting sensor 51 detects a leading end of the first package 3-1 and then outputs a detection signal. In response to receipt of this detection signal, the stop means 52 in the controller 50 is activated so that the drive of the first drive unit 13 for driving the movable conveyor 5 is disabled, after the first drive unit 13 being driven has been permitted to continue its revolution a predetermined number of revolutions, to bring the conveyor belt 11 to a halt thereby to bring the first package 3-1 to a predetermined stop position. In the event that the first package 3-1 has overrun the predetermined stop position, the first package 3-1 is brought into abutment with the stopper 42 and is thus regulated in position and, therefore, there is no possibility that the package may fall out of the movable conveyor 5.

When the first drive unit 13 is brought to a halt, the second drive unit 17 is activated according to a sequence control program so that the support frames 6 with the conveyor belt 11 carrying the first package 3-1 thereon are pivoted about the support shaft 7 with the discharge end of the movable conveyor 5 moving upwardly by the operation of the cranking plate 19, the turnbuckle 20, the first to third links 23 to 25 and the connecting rod 26. As soon as the discharge end of the movable conveyor 5 is brought to the elevated position at which a discharge end of the conveyor belt 11 of the movable conveyor 5 is substantially in level with a receiving end of the conveyor belt 40 of the fixed conveyor 30, a limit switch (not shown) is activated to bring the second drive unit 17 to a halt to thereby keep the movable conveyor 5 at the elevated position. During this pivotal movement of the movable conveyor 5, the first package 3-1 is correspondingly lifted with its leading end sliding along a surface of the stopper 42.

Figure 5:
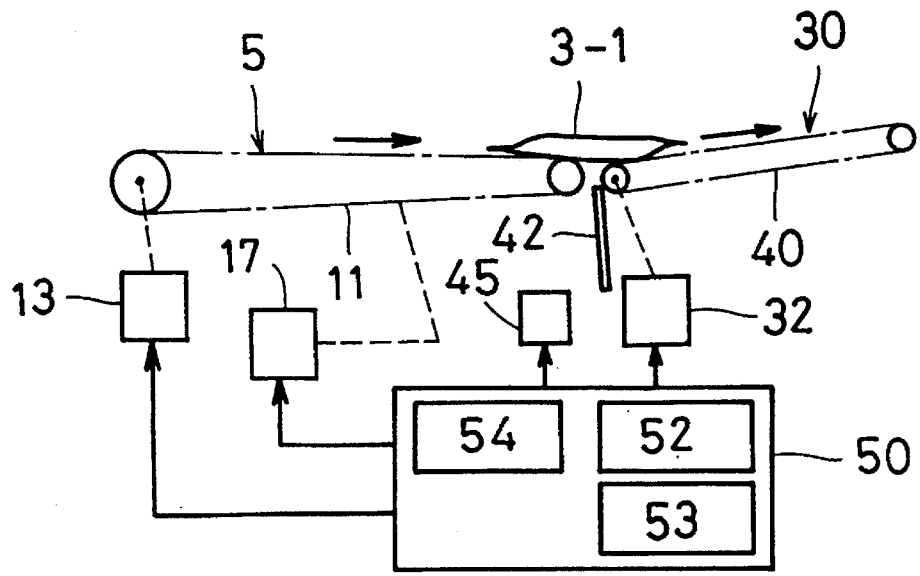
FIG. 5 is a schematic side view of that portion of the package rectifying apparatus according to the first preferred embodiment of the present invention, showing a second step performed by the package rectifying apparatus.

Subsequent to the arrival of the discharge end of the movable conveyor 5 at the elevated position, the feed control means 53 in the controller 50 is activated according to the sequence control program to drive the first and third drive units 13 and 32 synchronously to advance the first package 3-1 a predetermined distance from the stop position as shown in FIG. 5 and then to bring the first and third drive units 13 and 32 to a halt to stop the first package 3-1 after the first package 3-1 has been moved the predetermined distance from the stop position. At this time, the first package 3-1 is held in position having the leading end thereof resting on the conveyor belt 40 of the fixed conveyor 30 and the trailing end thereof resting on the conveyor belt 11 of the movable conveyor 5.

Figure 6:
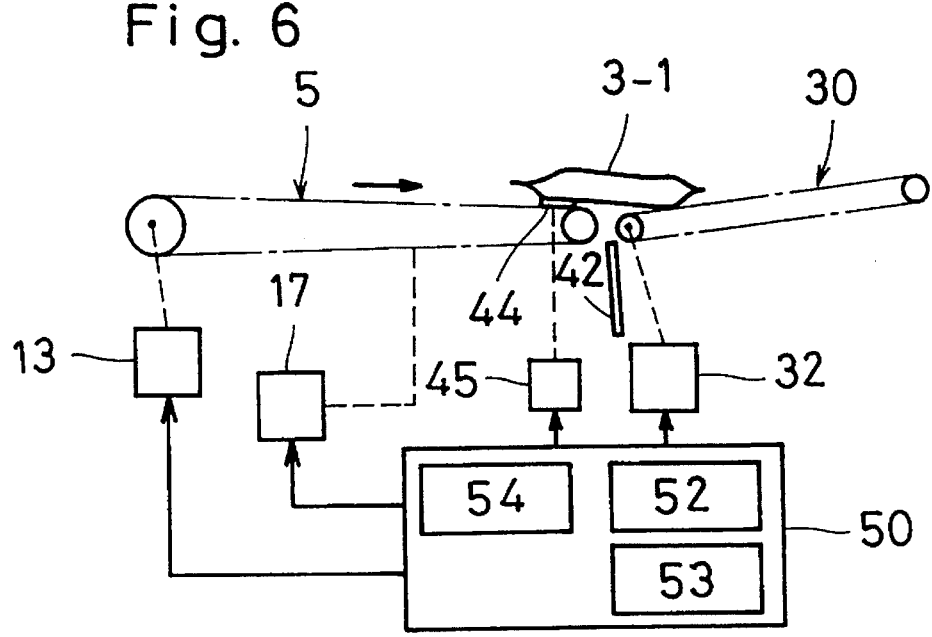
FIG. 6 is a schematic side view of that portion of the package rectifying apparatus according to the first preferred embodiment of the present invention, showing a third step performed by the package rectifying apparatus.
Figure 7:
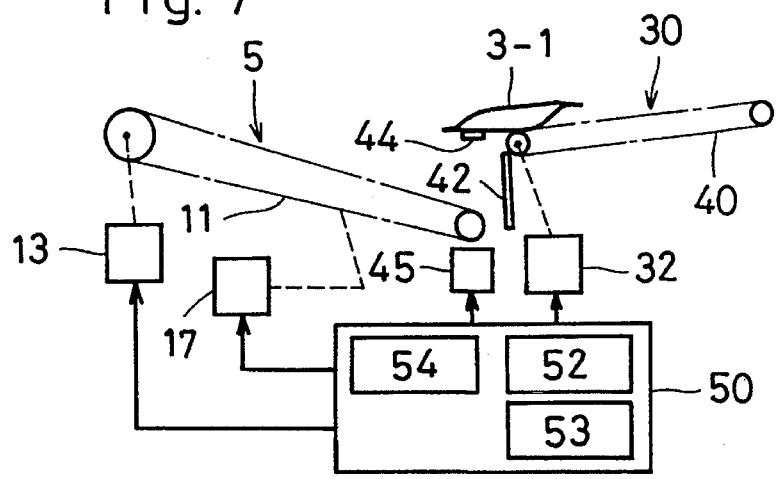
FIG. 7 is a schematic side view of that portion of the package rectifying apparatus according to the first preferred embodiment of the present invention, showing a fourth step performed by the package rectifying apparatus.

Simultaneously with this stop, the fourth drive units 45 for the holding means 43 shown in FIG. 3 are activated to cause the holding levers 44 to pivot from a position shown by the solid line to a position shown by the phantom line in FIG. 2 so as to protrude into the transport path straddling the movable and fixed conveyors 5 and 30 so that, as shown in FIG. 6, the trailing end of the first package 3-1 is retained by the holding levers 44 from below.

When a limit switch (not shown) detects the angular movement of the holding levers 44, the overlapping means 54 in the controller 50 is activated to drive the second drive unit 17 to pivot the support frames 6 with the discharge end of the movable conveyor 5 moving downwardly to the lowered position leaving the first package 3-1 above the conveyor belt 11. When a limit switch (not shown) detects a complete return of the movable conveyor 5 to the lowered position, the second drive unit 17 is brought to a halt. Simultaneously with the lowering of the movable conveyor 5, the overlapping means 54 activates the first drive unit 13 to run the conveyor belt 11 in readiness for receipt of the next succeeding package.

Figure 8:
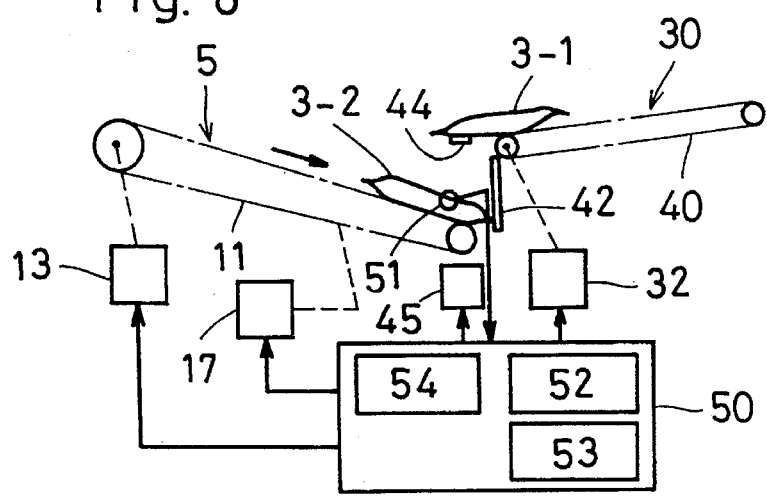
FIG. 8 is a schematic side view of that portion of the package rectifying apparatus according to the first preferred embodiment of the present invention, showing a fifth step performed by the package rectifying apparatus.

When the second package 3-2 is delivered onto the movable conveyor 5, the movable conveyor 5 transports the second package 3-2 towards the discharge end of the movable conveyor 5, that is, towards a position immediately beneath the first package 3-1, as shown in FIG. 8, in a manner similar to the transport of the first package 3-1. The second package 3-2 having been transported to the discharge end of the movable conveyor 5 is brought to the predetermined stop position by the operation of the article detecting sensor 51 and the stop means 52. Thereafter, the second drive unit 17 is activated in a manner described hereinbefore to pivot the support frames 6 about the support shaft 7 with the discharge end of the movable conveyor 5 consequently moving upwardly to the elevated position while the second package 3-2 rests thereon. At this time, the preceding package 3-1 is supported on and retained by the holding levers 44 while being brought to a standstill and positioned immediately above the next succeeding package 3-2 as clearly shown in FIG. 8.

Figure 9:
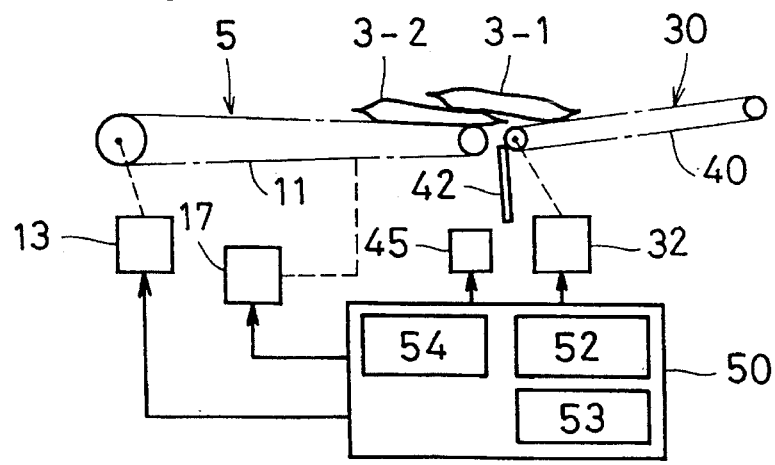
FIG. 9 is a schematic side view of that portion of the package rectifying apparatus according to the first preferred embodiment of the present invention, showing a sixth step performed by the package rectifying apparatus.

When this next succeeding package 3-2 is brought into contact with respective undersurfaces of the holding levers 44 to shift the latter slightly upwardly, this upward shift of the holding levers 44 is detected by a limit switch (not shown) which then activates the fourth drive unit 45 to pull out the holding levers 44 from the position shown by the phantom line to the position shown by the solid line in FIG. 2. In this way, a trailing end of the preceding package 3-1 assumes a position overlapping a leading end of the next package 3-2 as shown in FIG. 9.

Figure 10:
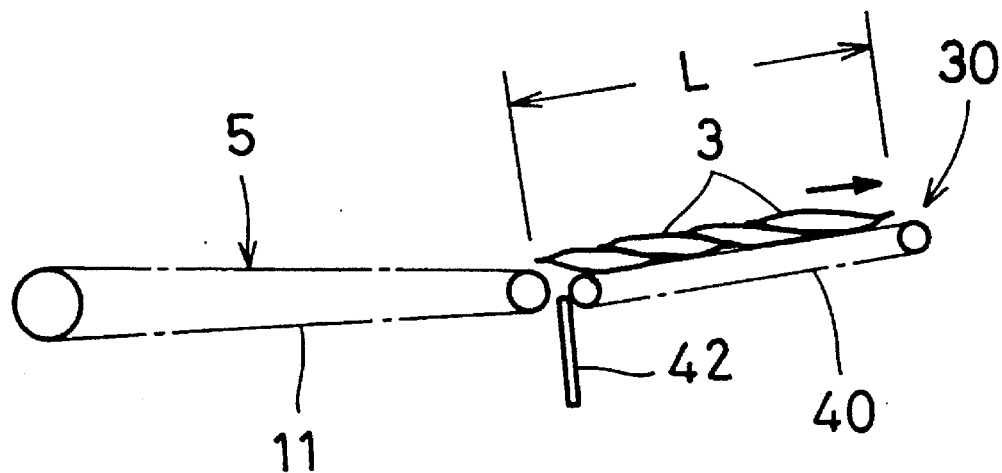
FIG. 10 is a schematic side view of that portion of the package rectifying apparatus according to the first preferred embodiment of the present invention, showing a seventh step performed by the package rectifying apparatus.
Figure 11:
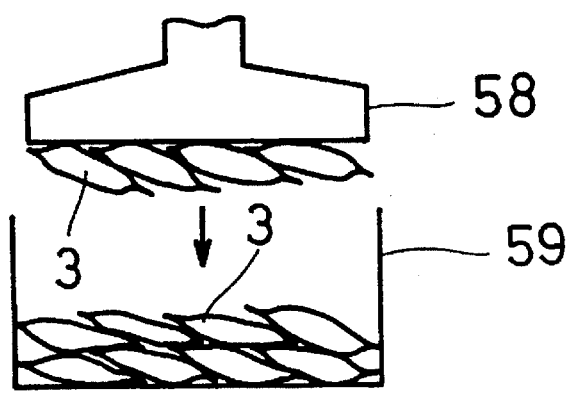
FIG. 11 is a schematic fragmentary side sectional view showing the manner in which rows of packages having been rectified are successively packed into a box.

When a rectification of a number of packages 3 has been completed by repeating the above described procedures a number of times equal to the number of the packages 3, the first and third drive units 13 and 32 are simultaneously activated to simultaneously operate the movable and fixed conveyors 5 and 30 to transfer all the packages 3 from the movable conveyor 5 onto the fixed conveyor 30 as shown in FIG. 10 and then from the fixed conveyor 30 towards a subsequent handling station where, for example, as shown in FIG. 11 the packages 3 being sucked by a vacuum sucking machine 58 are loaded into a box 59.

Should the size of the box 59 changes, the amount of feed determined by the feed control means 53 shown in FIG. 5, that is, the distance over which the package 3 is advanced from the stop position is to be varied to adjust the amount of overlap permitted between the neighboring packages 3 to thereby vary the total length L so that a row of the packages 3 can be efficiently and snugly loaded into the box 59 of a different size. Where the packages 3 are to be loaded into the box 59 while piled up in plural layers, the necessity may often occur that the number of the packages 3 forming one layer may vary from that forming another layer. By way of example, where ten packages 3 are desired to be packed in a single box, the number of the packages 3 in each layer may be four, four and three from the bottom of the box. In such case, while the total length L of the packages 3 in each layer is kept constant, the amount of overlap permitted between the neighboring packages 3 is to be adjusted to accommodate a varying number of the packages 3 for each layer.

As indicated above, since the leading end of each next succeeding package 3-2 is crawled under the trailing end of the preceding package 3-1, there is no possibility that the rearmost one of the packages 4 being transported will be toppled rearwardly to fall down as flapped by the wind and, therefore, the handling of the packages 3 can be facilitated. Moreover, since the amount of overlap between the neighboring packages 3 can be adjusted, no difference between the total length L of the packages 3 and the size L1 of the box is created even though the size L1 of the box or the number of the packages 3 laid down in the box varies, making it possible for the packages 3 to be efficiently and snugly packed in the box.

Second Embodiment

Figure 12:
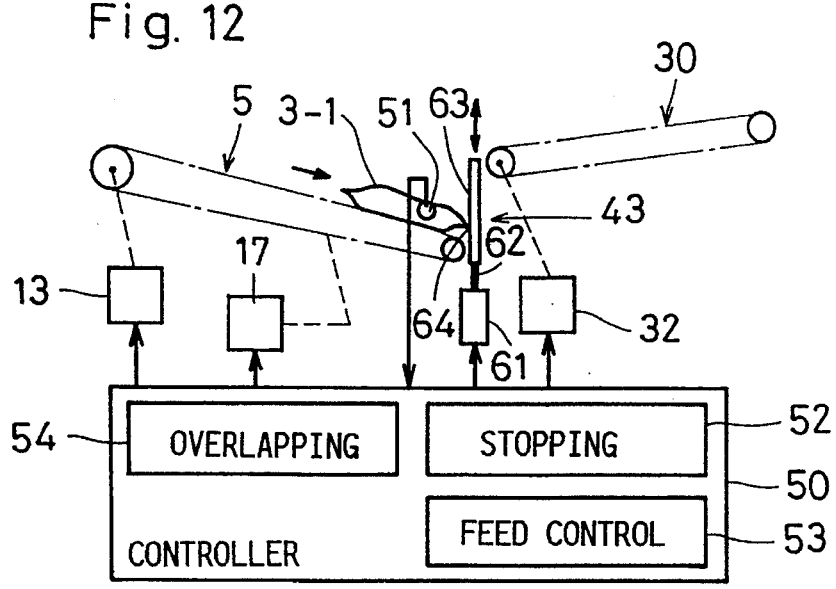
FIG. 12 is a schematic side view of that portion of the package rectifying apparatus according to the second preferred embodiment of the present invention, showing a first step performed by the package rectifying apparatus.
Figure 13:
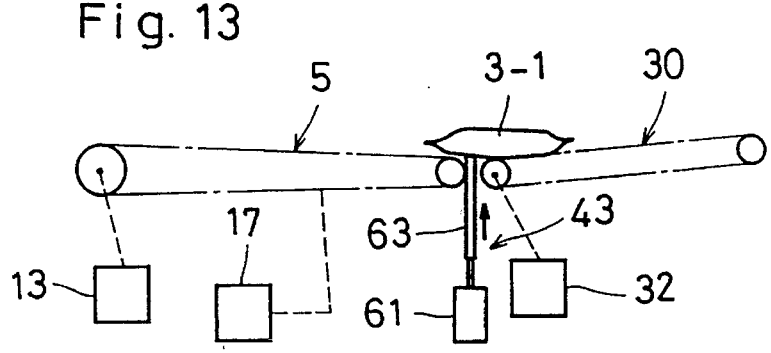
FIG. 13 is a schematic side view of that portion of the package rectifying apparatus according to a second preferred embodiment of the present invention, showing a second step performed by the package rectifying apparatus.
Figure 14:
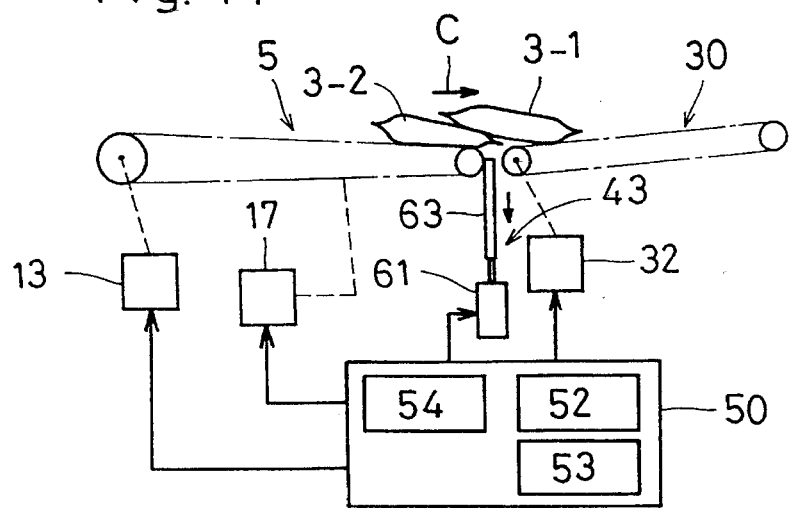
FIG. 14 is a schematic side view of that portion of the package rectifying apparatus according to the second preferred embodiment of the present invention, showing a third step performed by the package rectifying apparatus.

The second preferred embodiment of the present invention is shown in FIGS. 12 to 14. While most of component parts of the package rectifying apparatus according to the second preferred embodiment are similar to those according to the foregoing embodiment, the holding means 43 employed in the package rectifying apparatus according to the second preferred embodiment comprises a holding plate 63 fixedly mounted on an operating rod 62 adapted to be selectively extended and retracted by an air cylinder 61 so that the holding plate 63 can be selectively elevated and lowered, respectively. The holding plate 63 has a lower portion serving as a stopper 64 which, when the holding plate 63 is held in a lowered position, serves to position the package 3 which has been transported by the movable conveyor 5.

When the movable conveyor 5 carrying the first package 3-1 thereon is pivoted about the support shaft 7 with the discharge end thereof moving to the elevated position, the feed control means 53 in the controller 50 activates the first and third drive units 13 and 32 simultaneously to thereby advance the first package 3-1 the predetermined distance to allow the leading end of the first package 3-1 to rest on the receiving end of the fixed conveyor 30. Thereafter, as shown in FIG. 13, the holding plate 63 of the holding means 43 is elevated with an upper portion thereof consequently protruding into the transport path to support the trailing end of the first package 3 thereon.

After the next succeeding package 3-2 has subsequently been shift-ed upwardly by the movable conveyor 5 to allow the leading end thereof brought into contact with the trailing end of the preceding package 3-1 from below, the holding plate 63 is lowered as shown in FIG. 14 and both of the preceding and next succeeding packages 3-1 and 3-2 are advanced a predetermined distance towards the fixed conveyor 30 by the operation of the feed control means 53. Thereafter, the holding plate 63 is again elevated to retain the trailing end of the next succeeding package 3-2. This procedure is repeated a number of times equal to the number of the packages 3 desired to be rectified for each layer.

Third Embodiment

Figure 15:
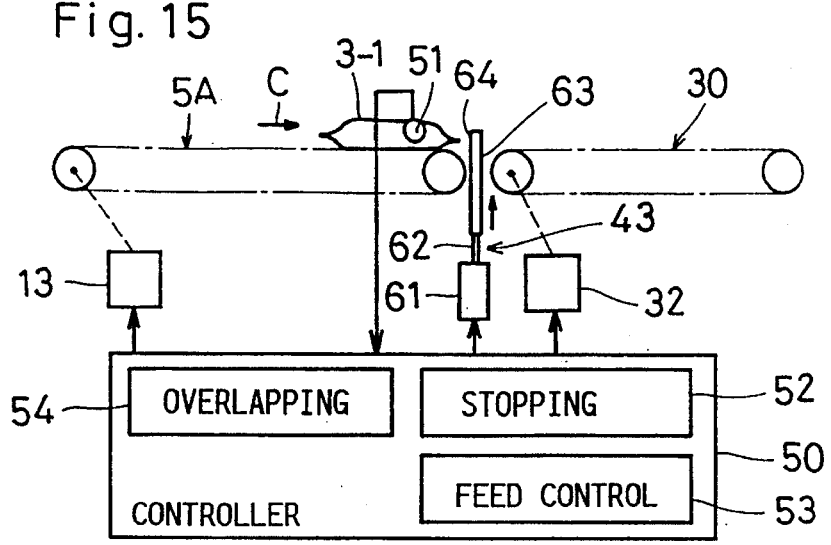
FIG. 15 is a schematic side view of that portion the package rectifying apparatus according to a third preferred embodiment of the present invention, showing a first step performed by the package rectifying apparatus.

The third preferred embodiment of the present invention is shown in FIGS. 15 to 18. As Shown in FIG. 15, first and second conveyors 5A and 30, both being fixed in position, are disposed to as to align with each other in a direction conforming to the direction C of transport of the packages 3, and the holding means 43 capable of being selectively elevated and lowered in a manner similar to that employed in the second embodiment of the present invention is disposed between the first and second conveyors 5A and 30. This holding means 43 includes the holding plate 63 having its upper portions serving as the stopper 64.

The first package 3-1 is brought to a standstill at the predetermined stop position by the operation of the stop means 52 activated in response to receipt of the detection signal fed from the article detecting sensor 51. At this time, the holding plate 63 has been elevated and, accordingly, the first package 3-1 when exceeding the stop position is brought into abutment with the stopper 64 of the holding plate 63 so as to be regulated in position. Therefore, there is no possibility that the package 3-1 is transported excessively beyond the stop position.

Figure 16:
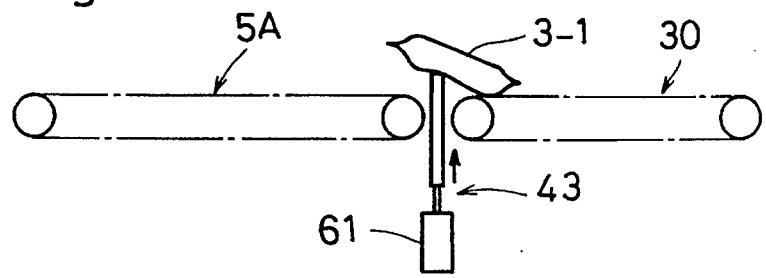
FIG. 16 is a schematic side view of that portion of the package rectifying apparatus according to the third preferred embodiment of the present invention, showing a second step performed by the package rectifying apparatus.

Following the stop of the package 3-1, and in accordance with the sequence control program, the feed control means 53 is activated in response to the lowering of the holding plate 63 to drive the first and second conveyors 5A and 30 simultaneously to advance the first package 3-1 the predetermined distance with the leading end thereof consequently resting on the second conveyor 30. Thereafter, as shown in FIG. 16, the holding plate 63 is again elevated to shift the trailing end of the first package 3-1 upwardly to a level higher than the level of the leading end of the next succeeding package 3-2.

Figure 17:
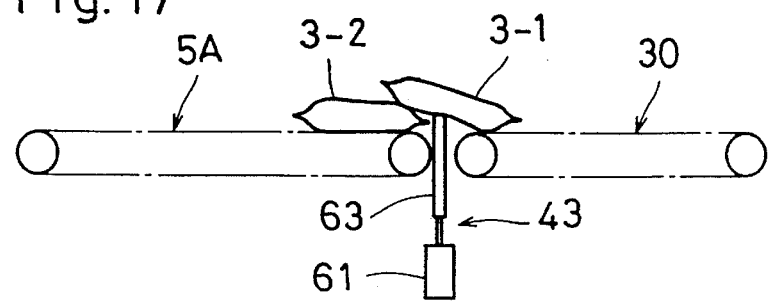
FIG. 17 is a schematic side view of that portion of the package rectifying apparatus according to the third preferred embodiment of the present invention, showing a third step performed by the package rectifying apparatus.
Figure 18:
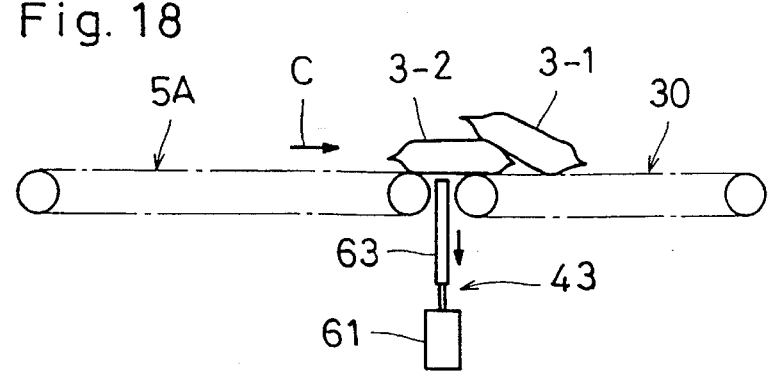
FIG. 18 is a schematic side view of that portion of the package rectifying apparatus according to the third preferred embodiment of the present invention, showing a fourth step performed by the package rectifying apparatus.

While in this condition, as shown in FIG. 17, the next succeeding package 3-2 is transported by the first conveyor 5A and is brought to a standstill with the leading end thereof crawled under the trailing end of the preceding package 3-1. At this time, the next succeeding package 3-2 is regulated in position by the stopper 64 of the holding plate 63 not to overrun the predetermined stop position. Thereafter, the holding plate 63 is lowered to allow the preceding and next succeeding packages 3-1 and 3-2 to be advanced the predetermined distance, and the holding plate 63 is subsequently elevated again to shift the trailing end of the next succeeding package 3-2. By repeating this procedure, the required number of the packages 3 which eventually form a single layer of package are rectified.

Fourth Embodiment

Figure 19:
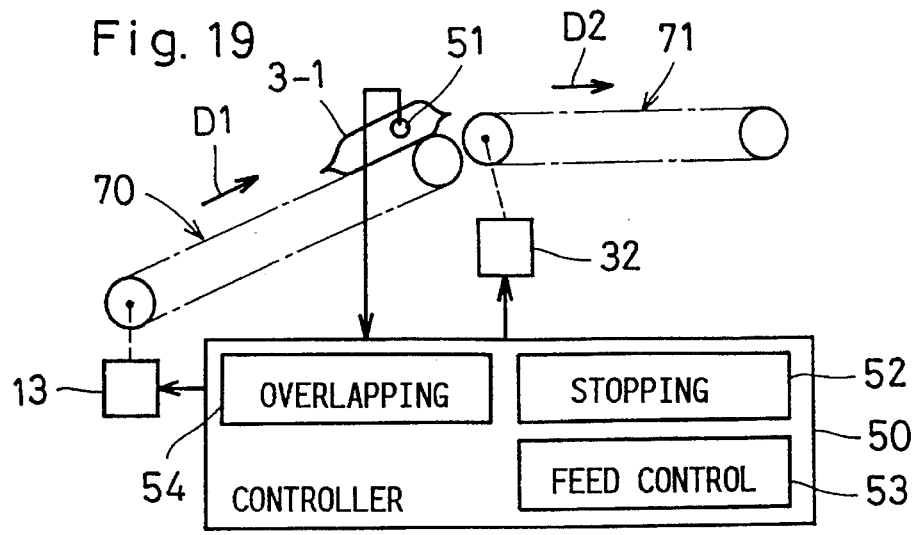
FIG. 19 is a schematic side view of that portion the package rectifying apparatus according to a fourth preferred embodiment of the present invention, showing a first step performed by the package rectifying apparatus.

The fourth preferred embodiment of the present invention is shown in FIGS. 19 to 22. Referring first to FIG. 19, leading and trailing conveyors 70 and 71 are fixed conveyor, and the trailing or first conveyor 70 is supported in an inclined fashion so as to successively transport the packages 3 upwardly in a direction shown by D1 while the leading or second conveyor 71 is disposed adjacent a discharge end of the first conveyor 70 and is operable to transport the packages 3 substantially horizontally in a direction shown by D2. Hence, the direction of transport D2 of the packages 3 by the second conveyor 71 is oriented lower than the direction of transport D1 of the packages 3 by the first conveyor 70. In this embodiment, the first conveyor 70 constitutes a transport mechanism for the successive transport of the packages 3 while the second conveyor 71 constitutes a retaining mechanism for retaining the trailing end of the preceding package at a level higher than the leading end of the next succeeding package.

The first package 3-1 is, after having been transferred from the first conveyor 70 onto the second conveyor 71, brought to a standstill at the predetermined stop position by the operation of the stop means 52 then operating in response to the detection signal fed from the article detecting sensor 51. Subsequently, the second conveyor 71 is driven in the opposite direction by the feed control means 53 to allow the trailing end of the first package 3-1 to protrude rearwardly from the receiving end of the second conveyor 71 as shown by the solid line in FIG. 20.

Figure 20:
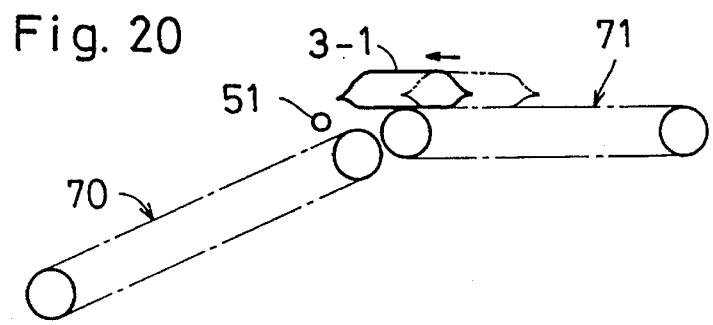
FIG. 20 is a schematic side view of that portion of the package rectifying apparatus according to the fourth preferred embodiment of the present invention, showing a second step performed by the package rectifying apparatus.
Figure 21:
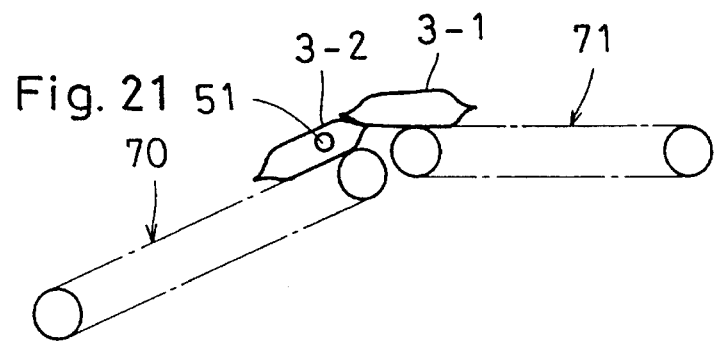
FIG. 21 is a schematic side view of that portion of the package rectifying apparatus according to the fourth preferred embodiment of the present invention, showing a third step performed by the package rectifying apparatus.
Figure 22:
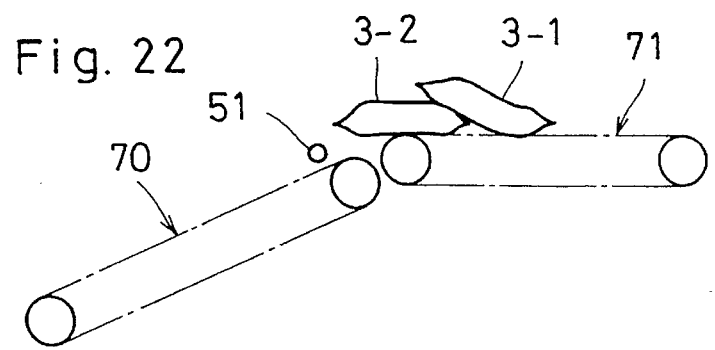
FIG. 22 is a schematic side view of that portion of the package rectifying apparatus according to the fourth preferred embodiment of the present invention, showing a fourth step performed by the package rectifying apparatus.

While in the condition as shown in FIG. 20, and as shown in FIG. 21, the next succeeding package 3-2 is transported by means of the first conveyor 70 and is subsequently brought to a standstill by the operation of the stop means 52 in response to the detection signal from the article detecting sensor 51 at the predetermined stop position at which the leading end of such next succeeding package 3-2 is held in contact from below with the trailing end of the preceding package 3-1. Thereafter, the first and second conveyors 70 and 71 are simultaneously driven by the feed control means 53 to advance both of the preceding and next succeeding packages 3-1 and 3-2 a predetermined distance and the simultaneous transport is halted at the time when the trailing end of the next succeeding package 3-2 is held in position to protrude outwardly from the receiving end of the second conveyor 71 as shown in FIG. 22.

As can readily be understood from the foregoing description, the stop position at which the next succeeding package 3-2 is brought to a standstill and the amount of feed of the next succeeding package 3-2 are different from those of the preceding package 3-1. Therefore, the use is made of a counter for counting the detection signals fed from the article detecting sensor 51 to differentiate the next succeeding package 3-2 from the preceding package 3-1. This operation is repeated until the required number of the packages 3 have been rectified preparatory to the loading into the box.

Fifth Embodiment

Figure 23:
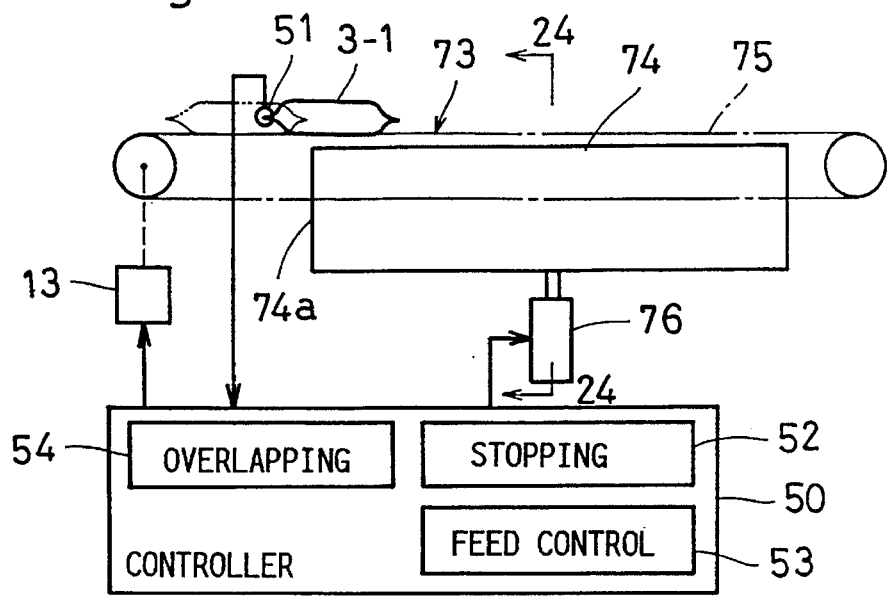
FIG. 23 is a schematic side view of that portion of the package rectifying apparatus according to a fifth preferred embodiment of the present invention, showing a first step performed by the package rectifying apparatus.
Figure 24:
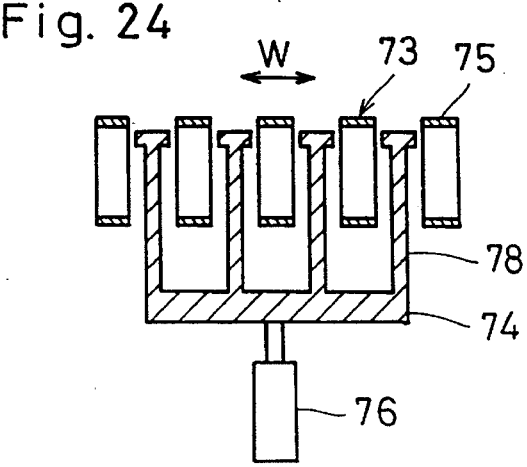
FIG. 24 is a cross-sectional view taken along the line 24—24 in FIG. 23.

The fifth preferred embodiment of the present invention is shown in FIGS. 23 to 27. Referring particularly to FIG. 23, a fixed transport conveyor 73 includes a plurality of juxtaposed conveyor belts 75 trained in side-by-side relationship with each other in a widthwise direction W of the fixed transport conveyor 73 as best shown in FIG. 24, and a pusher 74 forming the retaining means is disposed so as to traverse conveyor belts 75 in a direction perpendicular to the lengthwise direction of the fixed transport conveyor 73. This pusher 74 is adapted to be driven by an air cylinder 76.

Also as best shown in FIG. 24, the pusher 74 has a plurality of combs 78 formed integrally therewith in side-by-side relationship with each other, each neighboring combs 78 being spaced a distance corresponding to the width of the respective conveyor belt 75 so that the combs 78 can protrude into and move within associated spaces each between the neighboring conveyor belts 75.

Referring again to FIG. 23, when the first package 3-1 is transported by means of the fixed transport conveyor 73 and the leading end of the first package 3-1 reaches a position immediately succeeding a trailing end 74a of the pusher 74, the article detecting sensor 51 detects the presence of the leading end of the first package 3-1 to thereby generate the detection signal. In response to receipt of this detection signal the stop means 52 in the controller 50 is activated to allow the first drive unit 13, used to drive the fixed transport conveyor 73, to revolve a predetermined number of revolutions and then to bring the first drive unit 13 to a halt, causing the first package 3-1 to be brought to a standstill at a predetermined stop position indicated by the phantom line in FIG. 23. Then, by the operation of the feed control means 5,3, the first package 3-1 is advanced a predetermined distance from the stop position to a position shown by the solid line in FIG. 23.

Figure 25:
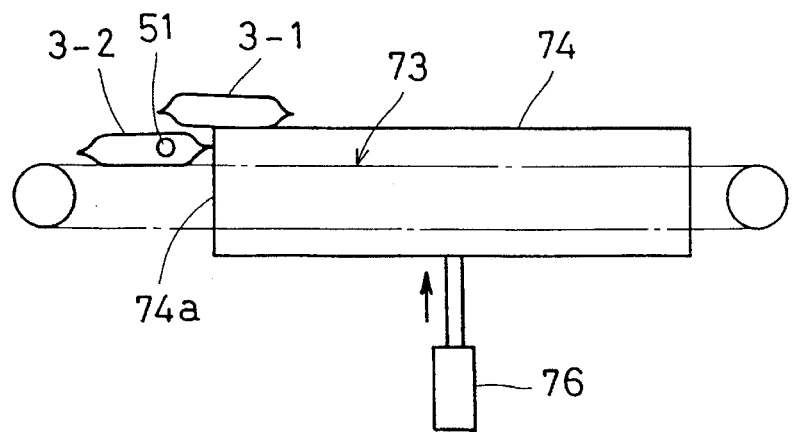
FIG. 25 is a schematic side view of that portion of the package rectifying apparatus according to the fifth preferred embodiment of the present invention, showing a second step performed by the package rectifying apparatus.

While in this condition, the air cylinder 76 is activated to elevate the pusher 74 to lift the first package 3-1 away from the conveyor belts 75 as shown in FIG. 25. As this time, the trailing end of the first package 3-1 so lifted by the pusher 74 protrudes outwardly rearward from the trailing end 74a of the pusher 74. The fixed transport conveyor 73 is subsequently driven again to transport the next succeeding package 3-2 in a manner similar to the transport of the preceding package 3-1 until the leading end of the next succeeding package 3-2 is brought under the trailing end of the preceding package 3-1 resting on the pusher 74 which has been elevated. In the event that at this time the next succeeding package 3-2 exceeds over the predetermined stop position, the leading end of the next succeeding package 3-2 is brought into engagement with the trailing end 74a of the elevated pusher 74 and is thus regulated in position without being excessively advanced beyond the predetermined stop position.

Figure 26:
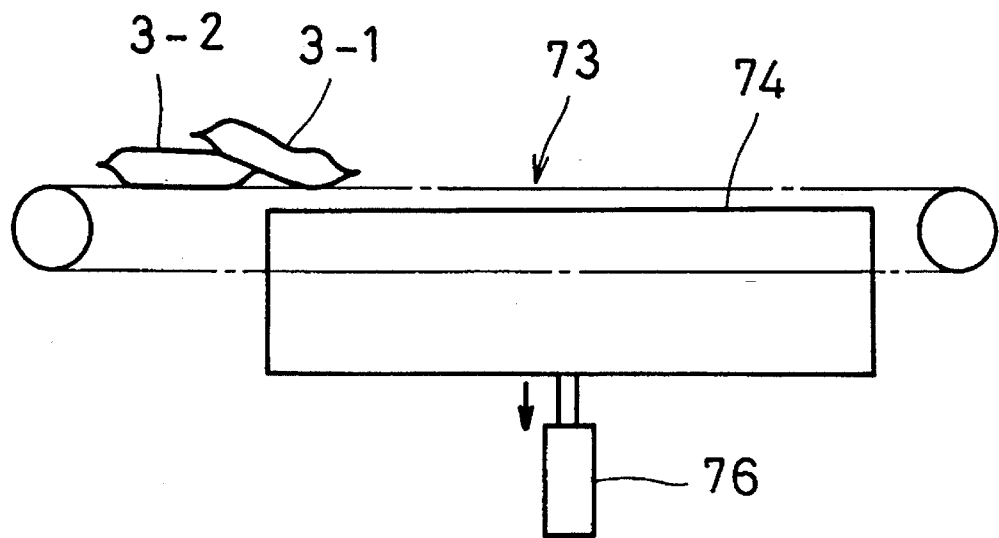
FIG. 26 is a schematic side view of that portion of the package rectifying apparatus according to the fifth preferred embodiment of the present invention, showing a third step performed by the package rectifying apparatus.
Figure 27:
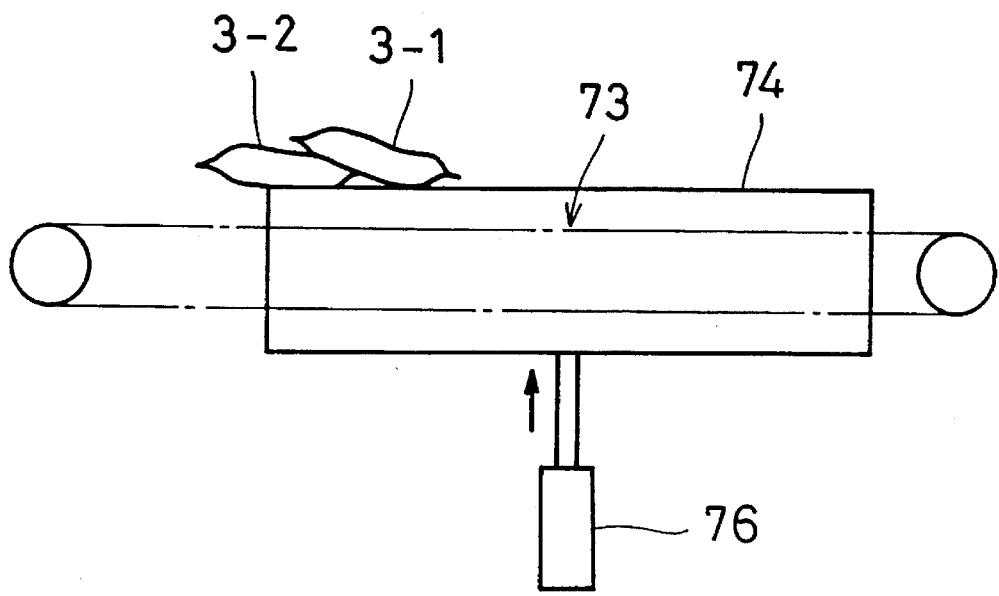
FIG. 27 is a schematic side view of that portion of the package rectifying apparatus according to the fifth preferred embodiment of the present invention, showing a fourth step performed by the package rectifying apparatus.

Thereafter, as shown in FIG. 26, as the pusher 74 is lowered, the trailing end of the preceding package 3-1 resting on the pusher 74 is brought above the leading end of the next succeeding package 3-2 then resting on the fixed transport conveyor 73. Once this condition as shown in FIG. 26 has been established, by the operation of the feed control means 53 both of the preceding and next succeeding packages 3-1 and 3-2 are advanced a predetermined distance and are brought to a standstill when the both come above the pusher 74 while the trailing end of only the next succeeding package 3-2 protrude rearwardly from the trailing end 74a of the pusher 74. Subsequently, as shown in FIG. 27, the pusher 74 is again elevated to lift both of the preceding and next succeeding packages 3-1 and 3-2. This operation is repeated a required number of times to rectify the required number of the packages 3 preparatory to the loading of them into the box.

Sixth Embodiment

Figure 28:
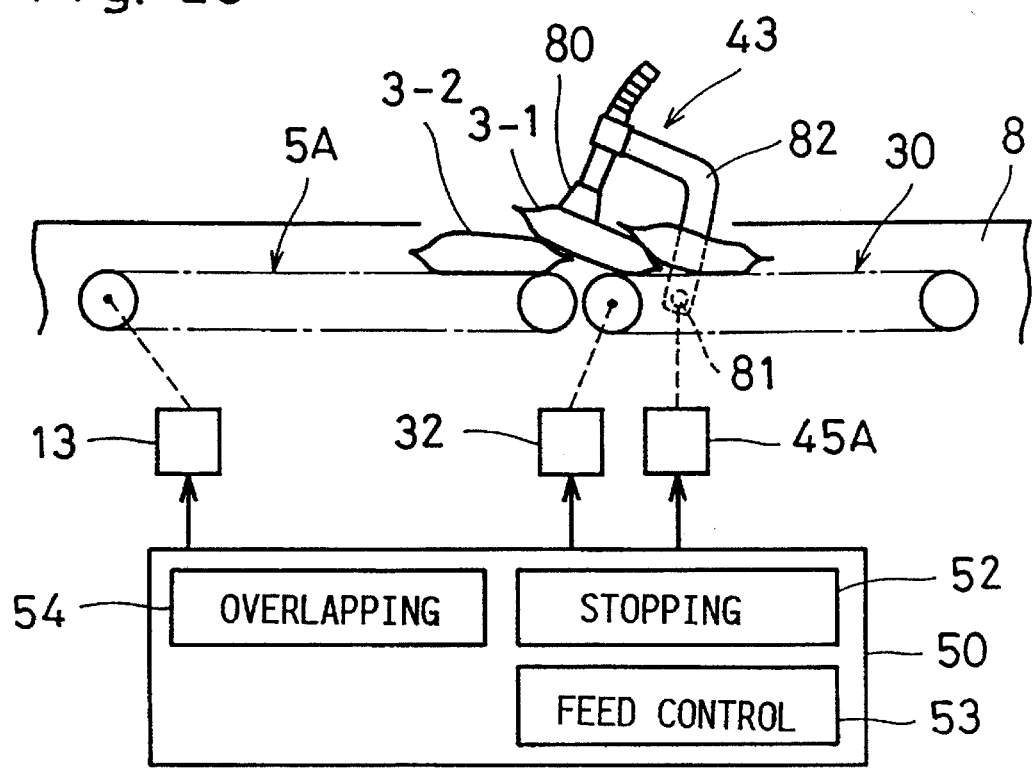
FIG. 28 is a schematic side view of that portion of the package rectifying apparatus according to a sixth preferred embodiment of the present invention.
Figure 29:
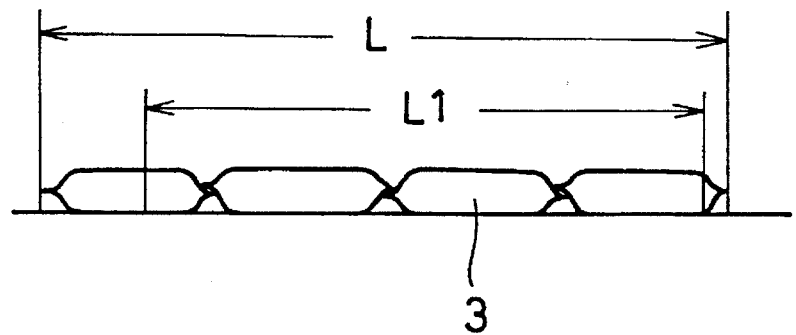
FIG. 29 is a schematic side view showing an example of the packages laid down horizontally.
Figure 30:
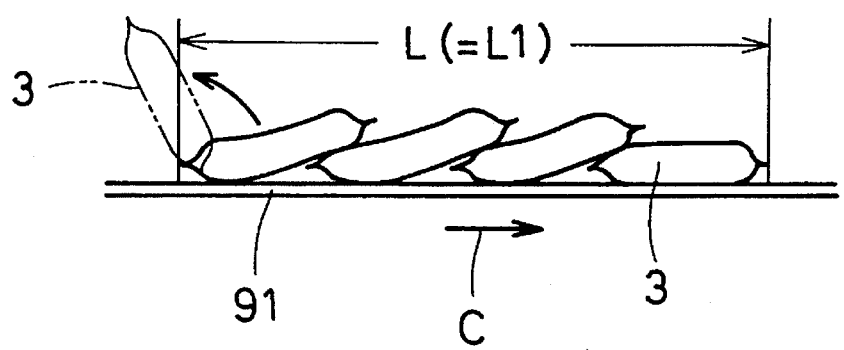
FIG. 30 is a schematic side view showing another example of the packages laid down with a leading end of one package overlapping a trailing end of the preceding package.
Figure 31:
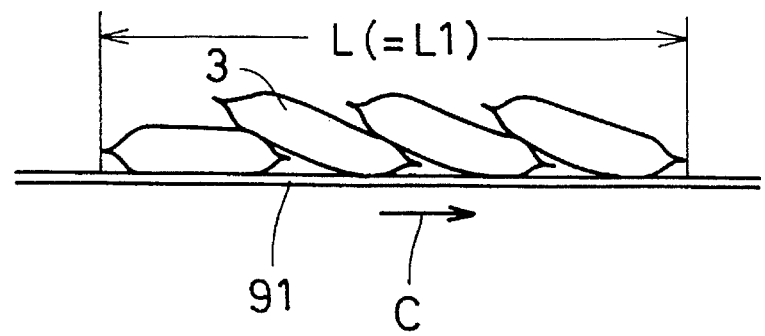
FIG. 31 is a schematic side view showing a further example of the packages laid down with a leading end of one package crawled under a trailing end of the preceding package.

The sixth preferred embodiment of the present invention is shown in FIG. 28. The package rectifying apparatus according to this embodiment is substantially similar to that according to the third embodiment of the present invention shown in and described with reference to FIGS. 15 to 18 except that, in place of the holding means 43 comprising the selectively upwardly and downwardly movable holding plate 63 used in the apparatus according to the third embodiment of the present invention, the holding means 43 comprising a suction holder 80 as shown in FIG. 28 is employed. The suction holder 80 is fixedly mounted through a support lever 82 on a support shaft 81 rotatably supported by the machine framework 8, said support shaft 81 being in turn drivingly coupled with the fourth drive unit 45A so that, when the fourth drive unit 45A is activated, the support shaft 81 is driven to move the suction holder 80 selectively up and down.

When the suction holder 80 is moved downwardly while the second conveyor 30 is held still, the trailing end of the preceding package 3-1 is sucked by the suction holder 80, after which the suction holder 80 is moved upwardly to lift the trailing end of the preceding package 3-1. As the trailing end of the preceding package 3-1 is lifted by the upward movement of the suction holder 80, the first conveyor 5 is driven to transport the next succeeding package 3-2 until the leading end of the next succeeding package 3-2 is brought under the trailing end of the preceding package 3-1. The suction holder 80 is subsequently again moved downwardly to allow the trailing end of the preceding package 3-1 to rest on the leading end of the next succeeding package 3-2 in an overlapping relationship.

It is to be noted that the holding means comprising the suction holder may be equally employed in the package rectifying apparatus according to the fifth embodiment of the present invention shown in and described with reference to FIGS. 23 to 27, in which case the holding means comprising the suction holder should supersede the holding means 43 comprising the pusher 74. Where the holding means comprising the suction holder is employed in the apparatus according to the fifth embodiment of the present invention, the holding means may be of a large size sufficient to suck all of the partially overlapped packages of a number required for each row of the packages to be loaded into a box.

It is to be noted that, in any one of the foregoing embodiments of the present invention, as an overlap amount control means, a position adjusting means comprising the article detecting sensor 51, the stop means 52 and the feed control means 53 has been used to adjust the position, at which the preceding package 3-1 is to be retained, with respect to the direction of transport. However, it is possible to adjust the amount of overlap between the preceding package 3-1 and the next succeeding package 3-2 by appropriately changing the stop position for the next succeeding package 3-2 in dependence on the detection signal fed from the article detecting sensor 51.

As hereinbefore fully described, according to the present invention, since after the rectification of the required number of the packages the leading end of the rearmost package in the row of the packages is crawled under the trailing end of the preceding package, the rearmost package does not topple rearwardly to fall down even though the row of the packages continues to be transported, thereby facilitating the handling of the packages. Also, since the amount of overlap between the neighboring packages can be adjusted, no difference between the total length of the packages and the size of the box is created even though the size of the box or the number of the packages laid down in the box varies, making it possible for the packages to be efficiently and snugly packed in the box. Moreover, the rectification of the packages is automatically performed, requiring no manual intervention in handling the packages and, therefore, the efficiency of work is high.

Industrial Applicability

The package rectifying apparatus according to the present invention is particularly suited as a rectifying apparatus for packing various packages or bags containing any suitable articles such as, for example, machine component parts, other than candies, foodstuff or the like.

What is claimed is:

1. A package rectifying apparatus for rectifying a plurality of packages transported in a package transport direction, the apparatus comprising:

rectifying and transport means for positioning a trailing end of a first package over a leading end of a second package so as to position the first and second packages in a relationship in which there is an amount of overlap between the trailing end of the first package and the leading end of the second package, and overlap amount adjusting means for adjusting the amount of overlap between the first and second packages, the rectifying and transport means comprising a transport mechanism for supplying a plurality of packages in succession, holding means for receiving a first package transported by the transport mechanism and for retaining the trailing end of the first package above the leading end of a second package while the first package is brought to a standstill, and overlapping means for driving the transport mechanism to transport the second package so as to bring the leading end of the second package under the trailing end of the first package retained by the holding means, the overlap amount adjusting means comprising position adjustment means for adjusting the position of the first package with respect to the package transport direction, the position adjustment means comprising:

a sensor for detecting a position to which at least the first package is transported by the transport mechanism and for generating a signal in response thereto, stop means, responsive to the signal generated by the sensor, for halting operation of the transport mechanism to thereby bring the first package to a predetermined stop position, and feed control means for driving the rectifying and transport means to thereby feed the first package a predetermined distance from the stop position.

2. The apparatus of claim 1, wherein the transport mechanism comprises a first conveyor and a second conveyor, the packages being transferrable from the first conveyor to the second conveyor, and wherein the position adjustment means is operable to adjust a position relative to the first conveyor of a package transferred from the first conveyor to the second conveyor.

3. The apparatus of claim 2, wherein the second conveyor defines a receiving end, the first conveyor and the second conveyor mutually define a transit path, the holding means is disposed between the first conveyor and the second conveyor and comprises means for holding a trailing end of a first package protruding from the receiving end of the second conveyor.

4. The apparatus of claim 3, wherein the first conveyor defines a receiving end and a delivery end, the delivery end being relatively closer to the second conveyor than the receiving end, wherein the delivery end of the first conveyor is angularly moveable between an elevated position and a lowered position, and wherein, in the elevated position, the first conveyer is positioned relative to the second conveyor such that the second conveyor is able to receive packages from the first conveyor.

5. The apparatus of claim 2, wherein the first conveyor defines a delivery end, and further comprising a Stopper positioned adjacent the delivery end of the first conveyor for abutting at least one of the packages.

6. The apparatus of claim 2, wherein the holding means comprises a stopper for abutting at least one of the packages.

7. The apparatus of claim 1, wherein the transport mechanism comprises a first conveyor having a delivery end and defining a direction of transport, and the holding means is disposed adjacent the delivery end of the first conveyor and comprises a second conveyor having a direction of transport oriented at an angle relative to the direction of transport of the first conveyor.

8. The apparatus of claim 1, wherein the transport mechanism comprises a conveyor and wherein the holding means comprises a pusher for lifting at least one of the packages transported by the conveyor.

9. The apparatus of claim 1, wherein the transport mechanism comprises a conveyor and wherein the holding means comprises a vacuum suction holder for sucking and lifting at least one of the packages transported by the conveyor.

* * * * *